United States Patent
Axmon et al.

(10) Patent No.: US 9,763,162 B2
(45) Date of Patent: Sep. 12, 2017

(54) CELL DETECTION IN A CELLULAR COMMUNICATIONS NETWORK

(71) Applicant: Telefonaktiebolaget L M Ericsson (publ), Stockholm (SE)

(72) Inventors: Joakim Axmon, Kävlinge (SE); Peter Alriksson, Hörby (SE); Torgny Palenius, Barsebäck (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/694,620

(22) Filed: Apr. 23, 2015

(65) Prior Publication Data

US 2016/0227462 A1 Aug. 4, 2016

Related U.S. Application Data

(60) Provisional application No. 62/110,193, filed on Jan. 30, 2015, provisional application No. 62/110,166, filed on Jan. 30, 2015.

(51) Int. Cl.
*H04W 36/00* (2009.01)
*H04W 36/32* (2009.01)
*H04B 7/022* (2017.01)
*H04B 7/08* (2006.01)
*H04W 16/28* (2009.01)

(52) U.S. Cl.
CPC ........... *H04W 36/32* (2013.01); *H04B 7/022* (2013.01); *H04B 7/0842* (2013.01); *H04W 16/28* (2013.01)

(58) Field of Classification Search
CPC ...................................................... H04W 36/32
USPC ........................................................... 455/436
See application file for complete search history.

(56) References Cited

U.S. PATENT DOCUMENTS

| | | | |
|---|---|---|---|
| 5,260,968 | A | 11/1993 | Gardner et al. |
| 5,615,409 | A | 3/1997 | Forssén et al. |
| 6,115,409 | A | 9/2000 | Upadhyay et al. |
| 6,304,760 | B1 | 10/2001 | Thomson et al. |

(Continued)

FOREIGN PATENT DOCUMENTS

| | | |
|---|---|---|
| CN | 104185256 A | 12/2014 |
| EP | 2214439 A1 | 8/2010 |

(Continued)

OTHER PUBLICATIONS

International Search Report and Written Opinion for International Patent Application No. PCT/EP2016/051878, mailed Apr. 25, 2016, 9 pages.

(Continued)

*Primary Examiner* — Timothy Pham
(74) *Attorney, Agent, or Firm* — Withrow & Terranova, PLLC

(57) ABSTRACT

Systems and methods relating to cell detection are disclosed. In some embodiments, systems and methods are disclosed for performing cell detection while suppressing interference from either a current serving cell or a previous serving cell of a wireless device depending on whether the wireless device is approaching the current serving cell or leaving the current serving cell. In this manner, cell detection is improved in a manner that is particularly suitable for, e.g., high speed train scenarios, but the systems and methods disclosed herein are not limited thereto.

31 Claims, 10 Drawing Sheets

(56) References Cited

U.S. PATENT DOCUMENTS

| | | | |
|---|---|---|---|
| 6,640,115 B1* | 10/2003 | Fujimoto | H04W 68/005 455/412.2 |
| 6,898,235 B1 | 5/2005 | Carlin et al. | |
| 6,950,678 B1 | 9/2005 | Mujtaba et al. | |
| 7,855,992 B2 | 12/2010 | Xu et al. | |
| 7,983,197 B2 | 7/2011 | Axmon et al. | |
| 8,102,956 B2 | 1/2012 | Dai et al. | |
| 8,248,993 B2 | 8/2012 | Cai | |
| 2002/0051436 A1 | 5/2002 | Ertel et al. | |
| 2002/0057660 A1 | 5/2002 | Park et al. | |
| 2002/0071384 A1 | 6/2002 | Hall et al. | |
| 2002/0137538 A1 | 9/2002 | Chen et al. | |
| 2003/0142756 A1 | 7/2003 | Kohno et al. | |
| 2003/0236108 A1 | 12/2003 | Li et al. | |
| 2004/0071207 A1 | 4/2004 | Skidmore et al. | |
| 2004/0243657 A1 | 12/2004 | Goren et al. | |
| 2004/0248519 A1 | 12/2004 | Niemela | |
| 2008/0122627 A1 | 5/2008 | Chang et al. | |
| 2012/0087263 A1* | 4/2012 | Li | H04L 27/2695 370/252 |
| 2012/0315938 A1 | 12/2012 | Van Nee et al. | |
| 2013/0188499 A1* | 7/2013 | Mach | H04W 48/20 370/252 |
| 2013/0244594 A1 | 9/2013 | Alrabadi et al. | |
| 2013/0279437 A1 | 10/2013 | Ng et al. | |
| 2014/0155072 A1* | 6/2014 | Hellmann | H04W 36/32 455/440 |
| 2014/0286298 A1 | 9/2014 | Yoshimoto et al. | |
| 2015/0063253 A1 | 3/2015 | Barbieri et al. | |
| 2015/0117341 A1* | 4/2015 | Ohwatari | H04L 5/0032 370/329 |
| 2015/0341846 A1 | 11/2015 | Shi et al. | |
| 2015/0365882 A1 | 12/2015 | Yang et al. | |

FOREIGN PATENT DOCUMENTS

| | | |
|---|---|---|
| EP | 2360967 B1 | 11/2011 |
| WO | 2013/056150 A1 | 4/2013 |
| WO | 2014/135204 A1 | 9/2014 |

OTHER PUBLICATIONS

Author Unknown, "Technical Specification Group Radio Access Network; Evolved Universal Terrestrial Radio Access (E-UTRA); Requirements for support of radio resource management (Release 11)," Technical Specification 36.133, Version 11.11.0, 3GPP Organizational Partners, Dec. 2014, 813 pages.

Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.

Author Unknown, "Technical Specification Group Radio Access Network; Evolved Universal Terrestrial Radio Access (E-UTRA);Physical channels and modulation (Release 12)," Technical Specification 36.211, Version 12.3.0, 3GPP Organizational Partners, Sep. 2014, 124 pages.

Lisheng, L. et al, "MAP Receiver with Spatial Filters for Suppressing Cochannel Interference in MIMO-OFDM Mobile Communications," IEEE 68th Vehicular Technology Conference, Sep. 21-24, 2008, pp. 1-5.

NTT Docomo, Inc. et al., "RP-142307: New SI proposal: Performance-enhancements for high speed scenario," 3rd Generational Partnership Project (3GPP), TSG RAN Meeting #66, Dec. 8-12, 2014, 7 pages, Maui, Hawaii.

Widrow, B. et al., "Adaptive Signal Processing," Prentice-Hall, Inc., 1985, pp. 372-383.

Ericsson, "R4-152849: Modified arrangement for RRH based model," 3rd Generation Partnership Project (3GPP), TSG RAN WG4 Meeting #75, May 25-29, 2015, 8 pages, Fukuoka, Japan.

Non-Final Office Action for U.S. Appl. No. 14/693,649, mailed Mar. 11, 2016, 7 pages.

International Search Report and Written Opinion for International Patent Application No. PCT/EP2016/051888, mailed Mar. 16, 2016, 14 pages.

International Search Report and Written Opinion for International Patent Application No. PCT/EP2016/057409, mailed Jun. 20, 2016, 10 pages.

Non-Final Office Action for U.S. Appl. No. 14/694,604, mailed Aug. 25, 2016, 19 pages.

Notice of Allowance and AFCP 2.0 Decision for U.S. Appl. No. 14/694,604, mailed Jun. 7, 2017, 10 pages.

* cited by examiner

CELL DETECTION IN A CELLULAR COMMUNICATIONS NETWORK

RELATED APPLICATIONS

This application claims the benefit of provisional patent application Ser. No. 62/110,193, filed Jan. 30, 2015, and provisional patent application Ser. No. 62/110,166, filed Jan. 30, 2015, the disclosures of which are hereby incorporated herein by reference in their entireties.

TECHNICAL FIELD

The present disclosure relates to cell detection in a cellular communications network.

BACKGROUND

High speed train scenarios are challenging for User Equipment device (UE) mobility function in that the UE may leave and enter cells rapidly and, therefore, the UE has to quickly detect suitable candidates for handover or cell reselection in order to not lose connection or miss a page or paging signal.

Current $3^{rd}$ Generation Partnership Project (3GPP) standards have partly taken UE speeds up to 300 kilometers per hour (km/h) into account, but only for the data demodulation part, not for the cell detection. With increased deployment of high speed train lines, increased number of UE users, and increased usage of bandwidth per user, dominating operators are requesting improved UE performance and support for speeds exceeding 300 km/h.

Apart from the relatively shortened time for detecting suitable neighbor cells for handover or cell reselection, high speed may also lead to significant Doppler frequency shifts (or Doppler shift herein) of the received signal. The Doppler shift forces the UE to increase its demodulation frequency when moving towards the cell, and decrease its demodulation frequency when moving away from the cell, relative to the carrier frequency used in the network. The magnitude of the Doppler shift depends on the relative velocity of the UE towards the transmitting antenna, hence with transceivers close to the track, i.e., a small angle between the trajectory of the UE and the line between the UE and the transmitting antenna, a substantial part of the UE velocity will transfer into a Doppler shift. Moreover, there will be an abrupt change of sign of the Doppler shift when the UE passes the transmitting antenna and the smaller the angle, the more abrupt the change is.

The Doppler shift $\Delta f$ can be expressed as $$\Delta f = f\left(\sqrt{\frac{1-(v/c)}{1+(v/c)}} - 1\right)$$

where c is the speed of light and v is the relative velocity of the UE towards the transmitting antenna. With an angle $\alpha$ and an actual UE velocity $v_{UE}$, the relative velocity v towards the transmitting antenna giving rise to Doppler shift becomes $v = v_{UE} \cos \alpha$. How quick the transition is from a negative to a positive shift depends on how far away from the tracks the cell site is located, with lower Doppler shift and less abrupt change if far away and higher Doppler shift and abrupt change in case the cell site is close to the track.

The scenario is illustrated in FIG. 1, where the UE is on a high speed train connected to and moving away from Cell A.2 and quickly needs to detect Cell B.1 towards which it is moving. According to the current 3GPP standards, the cell site can be as close as 2 meters (m) from the tracks. The train may travel at speeds up to 450 km/h and the UE is handed over, or has to reselect cells to camp on, frequently.

Handover to a new Primary Cell (PCell), configuration of a new Secondary Cell (SCell), and configuration and activation of a new Primary Secondary Cell (PSCell) is usually based on measurement reports from the UE, where the UE has been configured by a network node to send measurement reports periodically, at particular events, or a combination thereof. The measurement reports contain physical cell Identity (ID), reference signal strength (Reference Signal Received Power (RSRP)) and reference signal quality (Reference Signal Received Quality (RSRQ)) of the detected cells.

Cell detection in 3GPP Long Term Evolution (LTE) systems, aiming at detecting and determining cell ID and cell timing of neighbor cells, is facilitated by two signals that are transmitted in each Enhanced Universal Terrestrial Radio Access Network (EUTRAN) cell on a 5 millisecond (ms) basis: the Primary and the Secondary Synchronization Signal (PSS and SSS, respectively). Moreover, Reference Signals (RSs) are transmitted in each cell in order to facilitate cell measurements and channel estimation.

The PSS exists in three versions, one for each out of three cell-within-group IDs, and is based on Zadoff-Chu sequences that are mapped onto the central 62 subcarriers and bordered by five unused subcarriers on either side. There are in total 168 cell groups, and information on to which cell group a cell belongs is carried by the SSS, which is based on m-sequences. This signal also carries information on whether it is transmitted in subframe 0 or subframe 5, which is used for acquiring frame timing. For a particular cell, the SSS is further scrambled with the cell's cell-within-group ID. Hence, in total there are 2×504 versions, two for each out of 504 physical layer cell IDs. Similar to PSS, SSS is mapped onto the central 62 subcarriers and bordered by five unused subcarriers on either side. The time (subframe)-frequency (subcarrier) grid or layout of synchronization signals in a 3GPP LTE Frequency Division Duplex (FDD) radio frame is shown in FIG. 2. Subframes 1-3 and 6-8 may be used for Multi-Broadcast Single-Frequency Network (MBSFN) or may be signaled to do so for other purposes, by which a UE cannot expect reference signals in more than the first Orthogonal Frequency Division Multiplexing (OFDM) symbol. The Physical Broadcast Channel (PBCH) (carrying Master Information Block (MIB)) and synchronization signals are transmitted at prior known OFDM symbol positions over the central 72 subcarriers.

Detection by a UE of a cell is, as is well-known in the art, based on matched filtering using the three PSS versions over at least five ms of received samples. Correlation peaks in the filter output may reveal synchronization signals from one or more cells. This is referred to as symbol synchronization.

Upon having established symbol synchronization and identified the cell-within-group ID, the next step is SSS detection to acquire frame timing and physical layer cell ID. After decoding the SSS, the cell group ID and thereby the full physical layer cell ID is acquired. Moreover, frame timing and cyclic prefix configuration are determined.

The pair of PSS and SSS is always transmitted from the same antenna port, but different pairs may be transmitted from different antenna ports (3GPP Technical Specification (TS) 36.211 V12.3.0, Section 6.11).

Existing methods of cell detection at a UE include:
Non-coherent PSS detection, where matched filtering is carried out individually for each receiver branch, and then the signal magnitudes (potentially squared to powers) of all receiver branches are added before peak detection is carried out.
Coherent SSS detection, where after having established where the PSS is located in time, the same PSS is used for estimating the radio channel for the cell-to-be-detected before coherently adding the SSS from the different receiver branches and carrying out decoding.
Non-coherent SSS detection, where the timing information from PSS is used but no radio channel is estimated based on it.

Furthermore, either method may also include interference cancellation of partially or fully overlapping signals from already detected cells, whereby the prior known signals are subtracted before carrying out the detection of PSS or decoding of SSS, see for instance commonly owned and assigned International Publication No. WO 2014/135204 A1 entitled CHANNEL ESTIMATION FOR INTERFERENCE CANCELLATION.

SUMMARY

Systems and methods relating to cell detection are disclosed. In some embodiments, systems and methods are disclosed for performing cell detection while suppressing interference from either a current serving cell or a previous serving cell of a wireless device depending on whether the wireless device is approaching the current serving cell or leaving the current serving cell. In this manner, cell detection is improved in a manner that is particularly suitable for, e.g., high speed train scenarios, but the systems and methods disclosed herein are not limited thereto.

In some embodiments, a method of operation of a wireless device comprises determining whether the wireless device is moving toward a current serving cell of the wireless device or away from the current serving cell of the wireless device. The method further comprises initiating suppression of transmissions from a previous serving cell of the wireless device during detection of a predetermined signal from another cell if the wireless device is moving toward the current serving cell and initiating suppression of transmissions from the current serving cell of the wireless device during detection of a predetermined signal from another cell if the wireless device is moving away from the current serving cell.

In some embodiments, initiating suppression of transmissions from the previous serving cell of the wireless device during detection of the predetermined signal from another cell if the wireless device is moving toward the current serving cell comprises initiating suppression of transmissions from a perceived direction of the previous serving cell of the wireless device during detection of the predetermined signal from another cell if the wireless device is moving toward the current serving cell. Further, initiating suppression of transmissions from the current serving cell of the wireless device during detection of the predetermined signal from another cell if the wireless device is moving away from the current serving cell comprises initiating suppression of transmissions from a perceived direction of the current serving cell of the wireless device during detection of the predetermined signal from another cell if the wireless device is moving away from the current serving cell.

In some embodiments, the predetermined signal is a synchronization signal, a discovery signal, a reservation signal, or a reference signal.

In some embodiments, determining whether the wireless device is moving toward the current serving cell of the wireless device or away from the current serving cell of the wireless device comprises determining a direction of movement of the wireless device relative to the current serving cell of the wireless device based on at least one of: a measured time drift of the current serving cell, a measured Reference Signal Received Power (RSRP) of the current serving cell, a channel quality indicator for the current serving cell, a Signal to Interference plus Noise Ratio (SINR) for the current serving cell, a detected Doppler frequency shift of the current serving cell, and one or more timing advance commands received from a base station controlling the current serving cell.

In some embodiments, determining whether the wireless device is moving toward the current serving cell of the wireless device or away from the current serving cell of the wireless device comprises determining a direction of movement of the wireless device relative to the current serving cell of the wireless device based on at least one of: a location of the wireless device as determined via a positioning system and historical information.

In some embodiments, initiating suppression of transmissions from the previous serving cell of the wireless device during detection of the predetermined signal from another cell if the wireless device is moving toward the current serving cell comprises running a cell detection procedure with interference suppression of transmissions from the previous serving cell of the wireless device if the wireless device is moving toward the current serving cell. Further, in some embodiments, initiating suppression of transmissions from the current serving cell of the wireless device during detection of the predetermined signal from another cell if the wireless device is moving away from the current serving cell comprises running the cell detection procedure with interference suppression of transmissions from the current serving cell of the wireless device if the wireless device is moving away from the current serving cell.

In some embodiments, the method further comprises determining whether the wireless device is in a high speed train scenario and, upon determining that the wireless device is in a high speed train scenario, performing the steps of determining whether the wireless device is moving toward the current serving cell of the wireless device or away from the current serving cell of the wireless device, initiating suppression of transmissions from the previous serving cell of the wireless device during detection of the predetermined signal from another cell if the wireless device is moving toward the current serving cell, and initiating suppression of transmissions from the current serving cell of the wireless device during detection of the predetermined signal from another cell if the wireless device is moving away from the current serving cell.

In some embodiments, the method further comprises detecting a change of a state of the wireless device, the state of the wireless device being maintained as either moving toward the current serving cell of the wireless device or away from the current serving cell of the wireless device based on a direction of movement of the wireless device relative to the current serving cell of the wireless device. The method further comprises, upon detecting a change of the state of the wireless device, performing the steps of determining whether the wireless device is moving toward the current serving cell of the wireless device or away from the current serving cell of the wireless device, initiating suppression of transmissions from the previous serving cell of the wireless device during detection of the predetermined signal from another cell if the wireless device is moving toward the current serving cell, and initiating suppression of transmissions from the current serving cell of the wireless device during detection of the predetermined signal from another cell if the wireless device is moving away from the current serving cell.

In some embodiments, determining whether the wireless device is moving toward the current serving cell of the wireless device or away from the current serving cell of the wireless device comprises determining that the wireless device is moving away from the current serving cell of the wireless device, and initiating suppression of transmissions from the current serving cell of the wireless device during detection of the predetermined signal from another cell is performed upon determining that the wireless device is moving away from the current serving cell of the wireless device. The method further comprises, after performing an intra-frequency handover from the current serving cell to a new current serving cell, continuing to suppress transmission from the current serving cell of the wireless device during detection of the predetermined signal from another cell while the wireless device is moving toward the new current serving cell.

In some embodiments, the method further comprises compensating for a negative frequency offset during cell detection if the wireless device is moving toward the current serving cell and compensating for a positive frequency offset during cell detection if the wireless device is moving away from the current serving cell.

In some embodiments, cell detection comprises detecting a Secondary Synchronization Signal (SSS) such that compensating for the negative frequency offset during cell detection comprises compensating for the negative frequency offset during detection of the SSS, and compensating for the positive frequency offset during cell detection comprises compensating for the positive frequency offset during detection of the SSS.

In some embodiments, the negative frequency offset is equal to −2 times a Doppler shift of a serving cell of the wireless device, and the positive frequency offset is equal to +2 times the Doppler shift of the serving cell of the wireless device.

In some embodiments, the method further comprises repeating cell detection using the Doppler shift of the serving cell of the wireless device.

Embodiments of a wireless device are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
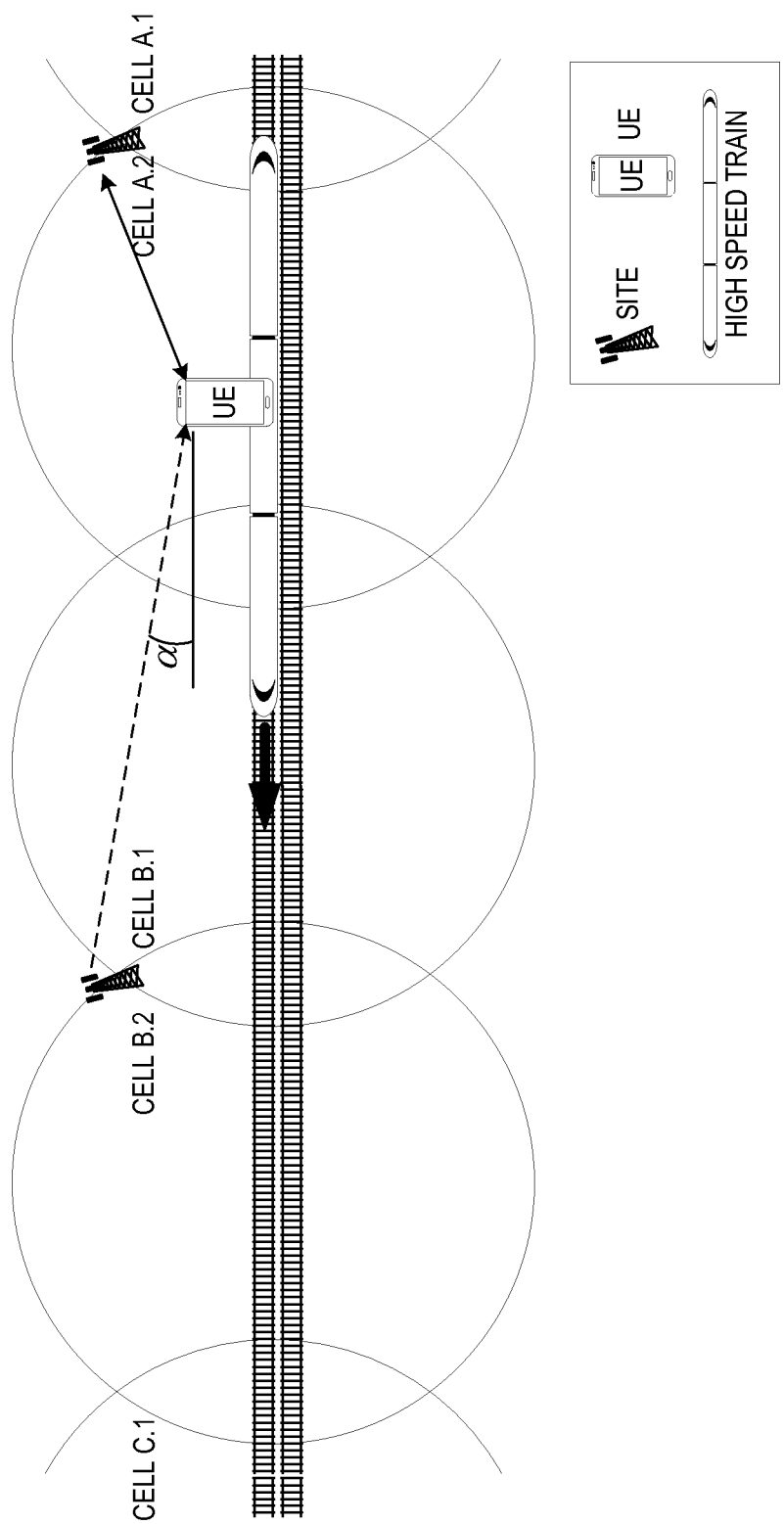
FIG. 1 illustrates an exemplary high speed train scenario.
Figure 2:
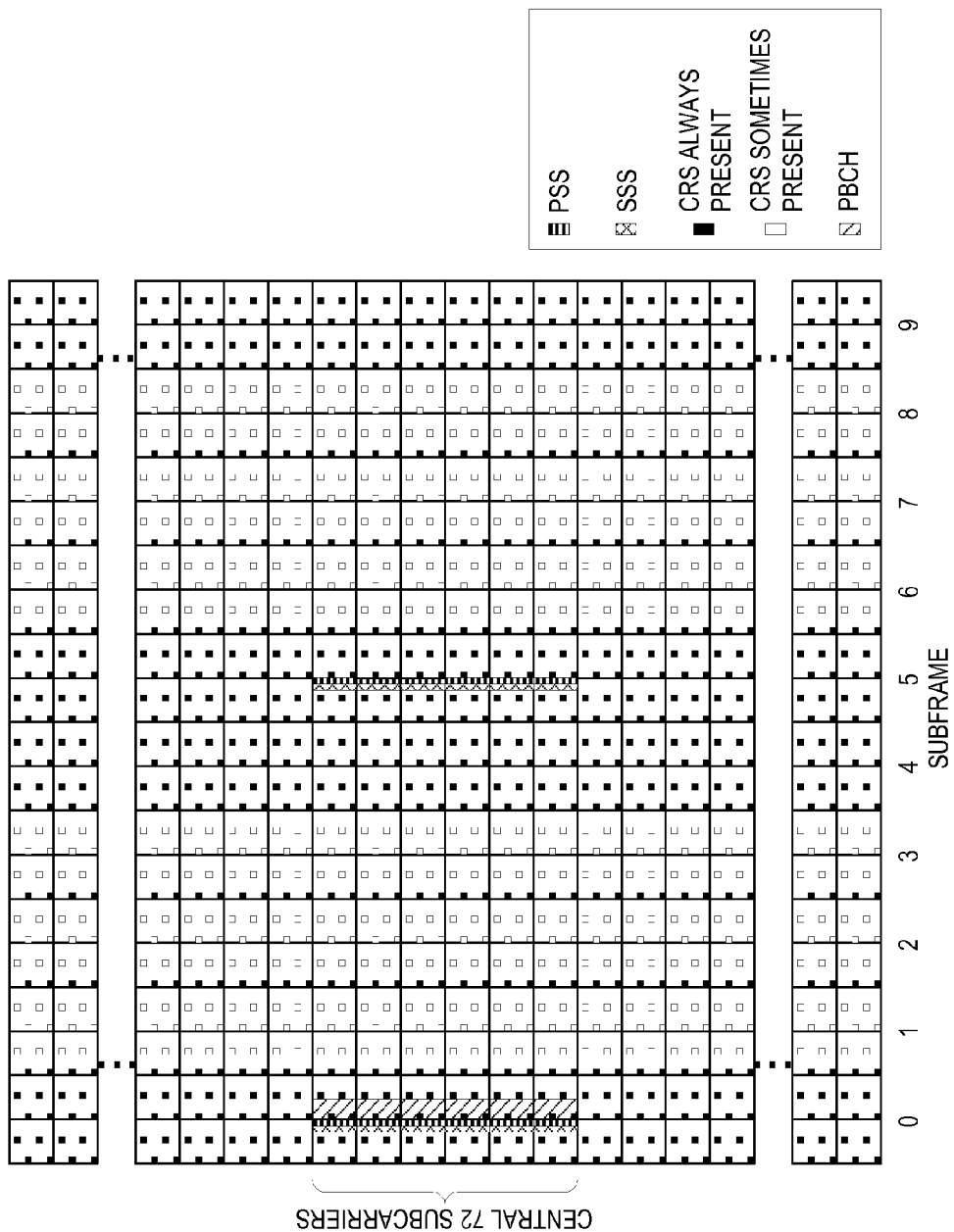
FIG. 2 illustrates a time-frequency grid of a legacy Long Term Evolution (LTE) Frequency Division Duplex (FDD) cell that is wider than the smallest downlink system bandwidth of 1.4 megahertz (MHz) (72 subcarriers or six resource blocks)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Notably, the embodiments described herein focus on $3^{rd}$ Generation Partnership Project (3GPP) Long Term Evolution (LTE) and, as such, 3GPP LTE terminology (e.g., User Equipment device (UE), Primary Synchronization Signal (PSS), and Secondary Synchronization Signal (SSS)) are oftentimes used. However, the present disclosure is not limited to 3GPP LTE and may be utilized in any suitable cellular communications network to improve synchronization signal detection. As such, more general terminology may be used (e.g., the term wireless device may be used as a more general term in lieu of UE). Further, while the discussion herein focuses on a high speed train scenario, the present disclosure is not limited thereto. The embodiments described herein may be applied in any suitable scenario (e.g., in a very dense small cell scenario where the UE transitions between cells quickly and/or when there is line of sight and a high Doppler shift due to either high UE velocity, high carrier frequency, or both).

Up to and including 3GPP Enhanced Universal Terrestrial Radio Access (EUTRA) Release 12, the maximum speed for which performance has been secured through conformance testing is 300 kilometers per hour (km/h) for UE demodulation and 40 km/h for UE Radio Resource Management (RRM) (cell detection and cell measurements).

Today, high speed trains can reach speeds above 570 km/h, although commercial operating speeds are generally lower. For instance, TGV (France) is operating commercially at 300 km/h but it is planned to increase this to 350 km/h. China Railway is operating commercially at 350 km/h, Shanghai Maglev (China) is operating commercially at 430 km/h, and Shinkansen (Japan) is operating commercially at 300 km/h. In many European countries as well as in the US there are trains operating commercially at speeds of 200-250 km/h.

A good demodulation performance is needed in order to maintain a data connection or a call while travelling at high speed, but it is not enough. If the UE or wireless device is not handed over in time to the next cell, e.g. if the UE or wireless device has not reported the cell, the connection or call might be dropped. Similarly, if a UE is late on detecting a next cell to camp on, it might miss pages, e.g., for incoming calls. Hence, it is equally important for the mobility function that UE RRM can support the speeds used by trains in commercial operation.

Due to competitiveness on dye size and power consumption, chipset vendors typically do not design for more than fulfillment of conformance requirements as imposed by standard, by operators, or by UE vendors. As such, many chipsets are designed to just barely satisfy these requirements. UEs using chipsets that just barely satisfy current 3GPP requirements will likely suffer from less than desired performance in high speed train scenarios.

A work item (3GPP RP-142307) on improving LTE UE performance under a high speed train scenario was agreed at the 3GPP Radio Access Network (RAN) Meeting #66 plenary.

Embodiments of systems and methods that address these problems are disclosed herein. In some embodiments, when in high speed mobility, the UE initiates suppression of the transmissions from a serving cell as soon as the UE starts moving away from the site (i.e., the geographical location from which the transmission originates, e.g., the geographical location of the enhanced or evolved Node B (eNB), Remote Radio Head (RRH), or other radio access node originating the transmission). After handover to an intra-frequency neighbor cell (which then becomes the new serving cell of the UE), in case the UE is moving towards the new serving cell, the UE continues to suppress transmissions from the previous serving cell (i.e., the serving cell of the UE prior to the handover); otherwise, the UE initiates suppression of transmissions from the new serving cell instead. By doing so, the UE focuses its efforts on the cells ahead by increasing the Signal to Interference plus Noise Ratio (SINR) and thereby allowing the cells to be detected earlier. Earlier detection allows more time for handover preparations or cell re-selection and hence reduces the risk of dropping a call or missing a paging signal or page.

In some embodiments, as will be described further below, the UE detects or determines and keeps track of whether it is moving towards or away from the serving cell site. In case the UE is moving away from the site, signals from cells that the UE is looking for might appear to have twice the Doppler shift since the serving cell is used as frequency reference by the UE which might be moving towards the site of the yet-to-be-detected cell. Hence, in some embodiments, when the UE is moving away from the serving cell site, the UE searches for cells both at the same carrier frequency as determined from the serving cell and the carrier frequency plus twice the Doppler shift. If, on the other hand, the UE is moving towards the serving cell site, in some embodiments, the UE searches for candidate cells on both the same carrier frequency as the serving cell and the carrier frequency minus twice the Doppler shift. Note that the Doppler shift of the candidate cells can be different than the Doppler shift of the serving cell due to the direction (angle and distance) to the base stations.

Estimation of the frequency shift and detection of whether the UE has passed the site of the serving cell can be based on, e.g., accumulation of the applied Automatic Frequency Control (AFC) commands over a sliding time interval.

Figure 3:
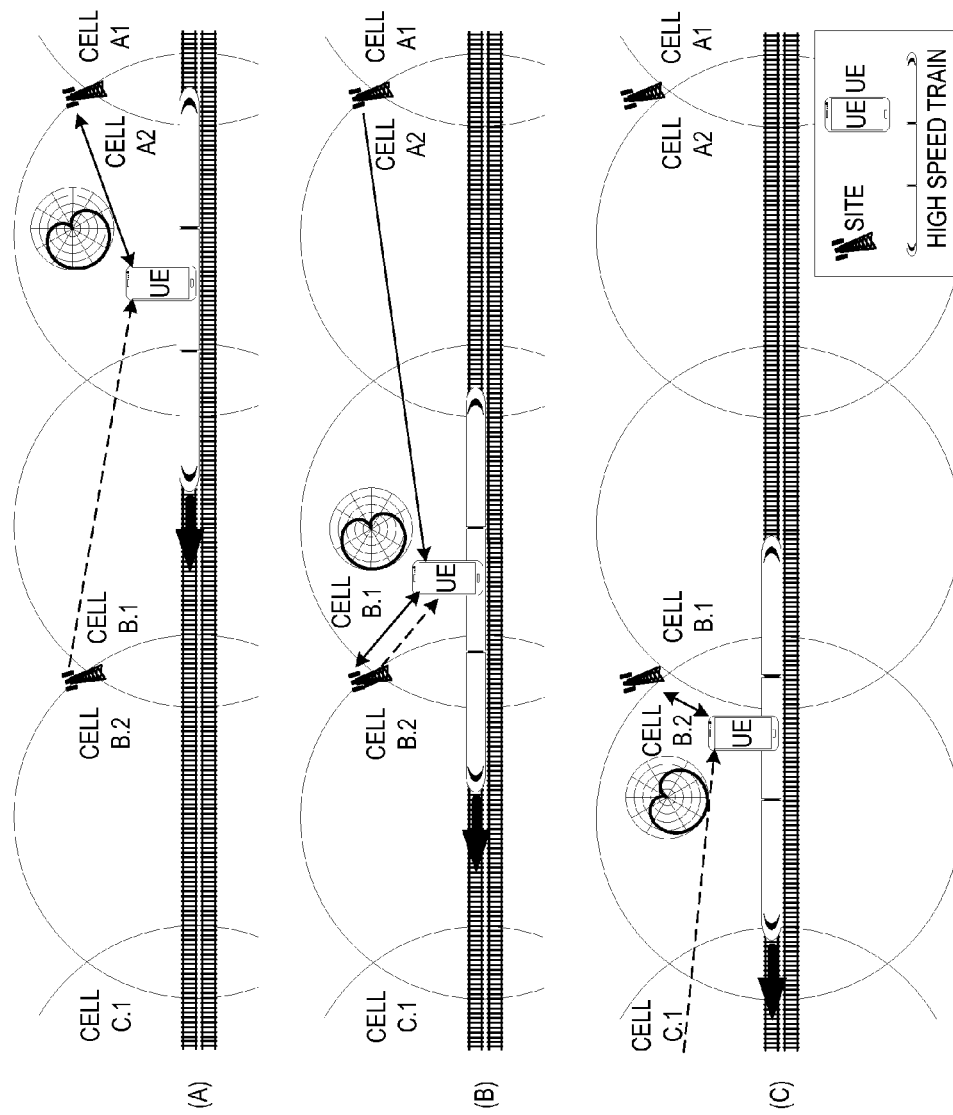
FIG. 3 illustrates a wireless device or User Equipment device (UE) onboard a high speed train being subjected to multiple handovers or executing multiple cell reselections in which cell suppression during cell detection is provided according to some embodiments of the present disclosure.

In one aspect of the present disclosure, the UE applies interference rejection of transmissions from the strongest cell that the UE is moving away from when carrying out cell detection. This improves the SINR of signals received from cells into whose coverage the UE will come next and thus allows those cells to be detected earlier than without interference rejection, as illustrated in FIG. 3, which illustrates a UE onboard a high speed train being subjected to multiple handovers or executing multiple cell reselections. The antenna diagrams show which cell is suppressed for each of the positions in (A) to (C) of FIG. 3. The UE is focusing on looking in the forward direction and minimizing interference from the strongest cell in the backward direction (serving cell (FIG. 3(A) or previous serving cell (FIG. 3(B)).

The reason to not always suppress transmissions from the strongest cell (serving cell) is that when the site of the strongest cell (serving cell) is in the direction towards which the train moves, a UE operating with only two receive antennas would also reject a significant part of the signal transmitted from the same site but for another sector, see for instance Cells B.1 and B.2 in FIG. 3(B). In case of synchronized Cells B.1 and B.2, the UE can employ interference cancellation techniques on the serving Cell B.1 (such as subtraction of known synchronization signals—see the Background section above) to improve the detection of SSS from Cell B.2.

A UE operating with more than two receive antennas may reduce the width of the angular notch in the antenna diagram and could then potentially reject also the serving cell, but the operation would be sensitive to estimation errors in cases where the serving cell and the next cell to be handed over to are received from almost the same direction. Although the notch is made narrow, there is a risk that it is placed in such a manner that it partially or fully suppresses the transmissions from the next cell to be handed over to, too. Additionally, the technique would also require the UE to use more receiver branches when in Radio Resource Control (RRC) idle mode with a penalty on power consumption and standby times.

The interference rejection may be achieved by combining received signals from two or more receive antenna branches in such a manner that the synchronization signals and other signals sent on the same antenna port of the cell to be rejected add up destructively. By selecting combining weights properly, most of the unwanted components on one or more antennas cancel the corresponding components on other antenna(s). As a result, the SINR of signal components received from other cells increases and the cell detection performance improves.

Embodiments of an interference rejection scheme that can be utilized in the embodiments described herein are outlined in U.S. Provisional Patent Application No. 62/110,166, filed Jan. 30, 2015, entitled INTERFERENCE REJECTION FOR IMPROVED CELL DETECTION, which, while not essential, is incorporated herein by reference in its entirety. Some embodiments of the interference rejection scheme are briefly described below.

With $$y_k = \begin{bmatrix} y_{k,1} \\ y_{k,2} \end{bmatrix} \ ((2 \times 1) \text{ vector})$$

denoting the resource elements received for subcarrier k on two receive branches, and $$x_{q,k} = \begin{bmatrix} x_{q,k,1} \\ x_{q,k,2} \\ \vdots \\ x_{q,k,P(q)} \end{bmatrix} \ ((P \times 1) \text{ vector})$$

denoting complex information received from cell q and transmitted from P(q) antenna ports, and $$H_{q,k} = \begin{bmatrix} h_{11} & h_{12} & \cdots & h_{1P(q)} \\ h_{21} & h_{22} & \cdots & h_{2P(q)} \end{bmatrix}_{q,k} \ ((2 \times P) \text{ vector})$$

denoting the radio channel from each of the antenna ports used by cell q to each of the two receive antennas, the received resource elements can approximately be described by $y_k = H_{1,k} x_{1,k} + \Sigma_{q=2}^{Q} H_{q,k} x_{q,k} + v_k$ ((2×1) vector) where $v_k$ denotes noise and interference from other cells not included in the model.

The approximation is that when sampling the Orthogonal Frequency Division Multiplexing (OFDM) symbols according to the timing of cell 1, one might not be aligned with the symbol timing of the other cells q=2 . . . Q, and therefore the number of ports might change during the sampled OFDM symbol. However this has no impact on the addressed problem to solve.

Synchronization signals are transmitted from a single port, hence when the OFDM symbol carrying SSS for cell 1 is sampled, the radio channel matrix or (2×1) vector in this case becomes $$H_{1,k}^{(sync)} = \begin{bmatrix} h_{11} \\ h_{21} \end{bmatrix}_{1,k}.$$

The radio channel can be estimated since the SSS is prior known, resulting in $\hat{H}_{1,k}^{(sync)}$. In order to cancel or reject transmissions from the concerned p of weights $\theta_k$ which are orthogonal to $\hat{H}_{1,k}^{(sync)}$ is determined under the constraint that $\theta_k^H \theta_k = 1$ to avoid the trivial solution where both weights are zero $$\begin{cases} \theta_k^H \hat{H}_{1,k}^{(sync)} = 0 \\ \theta_k^H \theta_k = 1 \end{cases}.$$

The weights correspond to the eigenvector spanning the null space of $\hat{H}_{1,k}^{(sync)} (\hat{H}_{1,k}^{(sync)})^H$ and can be determined, e.g., via eigenvalue decomposition. The resulting resource element $z_k$, where synchronization signals for cell 1 are rejected, is found by combining over the receive branches using the derived weights $z_k = \theta_k^H y_k$.

This derivation can be extended to a sub-band or even the full bandwidth. Depending on how the channel estimates are constructed (whether by an over-determined system or not) it might be so that a null space does not exist, and then one may take the eigenvector spanning the subspace associated with the least eigenvalue instead.

The example above is for two receive branches. This can be extended to N receive branches as follows. Denoting a resource element k received on the UE side using N receiver antennas as a (N×1) vector:

$$y_k = \begin{bmatrix} y_{k,1} \\ y_{k,2} \\ \vdots \\ y_{k,N} \end{bmatrix}$$

and the information sent from cell q (known or unknown) (N×1) vector):

$$x_{q,k} = \begin{bmatrix} x_{q,k,1} \\ x_{q,k,2} \\ \vdots \\ x_{q,k,P(q)} \end{bmatrix}$$

where P(q) is the number of antenna ports used in that cell for this resource element, and the radio channel (N×P) matrix) seen by the UE from each of the antenna ports of cell q is denoted:

$$H_{q,k} = \begin{bmatrix} h_{11} & h_{12} & \cdots & h_{1P(q)} \\ h_{21} & h_{22} & \cdots & h_{2P(q)} \\ \vdots & \vdots & \ddots & \vdots \\ h_{N1} & h_{N2} & \cdots & h_{NP(q)} \end{bmatrix}_{q,k}$$

the received resource element k can somewhat simplified be expressed as (N×1) vector as:

$$y_k = \Sigma_{q=1}^{L} H_{q,k} x_{q,k} + \Sigma_{q=L}^{Q} H_{q,k} x_{q,k} v_k$$

where Q is the total number of received cells, L is the number of already detected cells, and $v_k$ is additive noise. Synchronization signals are transmitted from a single antenna port, hence for the concerned resource element (provided that it is aligned with the sampled OFDM symbol) there is only one signal sent from the base station or eNB and thus only one weight per receive antenna hence the radio channel for the synchronization signals can be described as the (N×1) matrix/vector $$H_{q,k}^{(sync)} = \begin{bmatrix} h_{11} \\ h_{21} \\ \vdots \\ h_{N1} \end{bmatrix}_{q,k}.$$

It is desirable to suppress any transmission from one or more already detected cells as they might partially overlap with synchronization signals of yet undetected cells. Additionally, the synchronization signals are often transmitted from physical antennas used for other channels and transmission modes as well, hence some interference from other than synchronization signals will be suppressed too.

Provided that L<N, i.e. the cells to suppress are fewer than the number of receive branches used for cell detection, it is desirable to find a set of coefficients $\theta_k$ ((N×1) vector), upon which the spatial weights will be based, that fulfills $$\begin{cases} \theta_k^H \hat{H}_{1,k}^{(sync)} = 0 \\ \theta_k^H \hat{H}_{2,k}^{(sync)} = 0 \\ \vdots \\ \theta_k^H \hat{H}_{L,k}^{(sync)} = 0 \\ \theta_k^H \theta_k = 1 \end{cases},$$

i.e., a set of coefficients that annihilates the signal components that have been subjected to particular radio channels, as captured by the channel estimates (sync) $\hat{H}_{1,k}^{(sync)}$ (N×1 vector), q=1 . . . L.

Arranging the channel estimates into a (N×L) matrix $C_k = [\hat{H}_{1,k}^{(sync)} \; \hat{H}_{2,k}^{(sync)} \; \ldots \; \hat{H}_{3,k}^{(sync)}]$, one can form the quadratic form $\theta_k^H C_k C_k^H \theta_k = 0$. Since L<N it means that the vector $\theta_k$ is in the null space of $C_k C_k^H$ ((N×N) matrix) and can be found, e.g., via eigenvalue decomposition. In case of N=L+1 there is only one vector in the null space hence it is uniquely determined, but in case N>L+1 there will several vectors that can be used as coefficients, either alone or in linear combination.

When having different weights for different sub-bands (groups of subcarriers), care needs to be taken not to have the desirable signal components on different subcarriers to be adding up destructively in the coherent summation, i.e., to introduce abrupt phase shifts between the $\theta_k$ and $\theta_{k+i}$ for "directions" other than the suppressed ones. Alternatively, one may for instance carry out a coherent summation for each sub-band followed by magnitude-square, and then carry out summation over the latter.

For the case of a single weight per receive antenna for the whole bandwidth may for instance form a (N×L) matrix:

$$C = [\bar{H}_1^{(sync)} \bar{H}_2^{(sync)} \ldots \bar{H}_L^{(sync)}]$$

where $$\bar{H}_l^{(sync)} = \frac{1}{62} \sum_{k=1}^{62} \hat{H}_{l,k}^{(sync)},$$

and search for a vector $\theta$ for which $\theta^H C C^H \theta = 0$ under the constraint $\theta^H \theta = 1$. Assuming a single set of weights (M=1), one cell to block (L=1) and two receive branches (N=2), the weights $$\begin{cases} w_{11} = \theta_1^* \\ w_{12} = \theta_2^* \end{cases}$$

can be used to suppress the direction from which PSS and SSS are sent out in the detected cell.

Alternatively, one can determine the weights by forming $$C = [\bar{H}_{1,1}^{(sync)} \bar{H}_{1,2}^{(sync)} \ldots \bar{H}_{L,62}^{(sync)}]$$

and then search for the subspace associated with the smallest eigenvalue since $CC^H$ is not rank deficient by design, and hence it cannot be guaranteed that there exists a null space. The difference between the approaches is mainly that in the latter alternative the average channel weights are implicitly derived in a least squares manner.

It shall be noted that these are only a few out of a multitude of alternatives for determining the weights. The objective, however, is the same: to suppress signal components from one or more already detected cell(s), simultaneously or sequentially.

Figure 4:
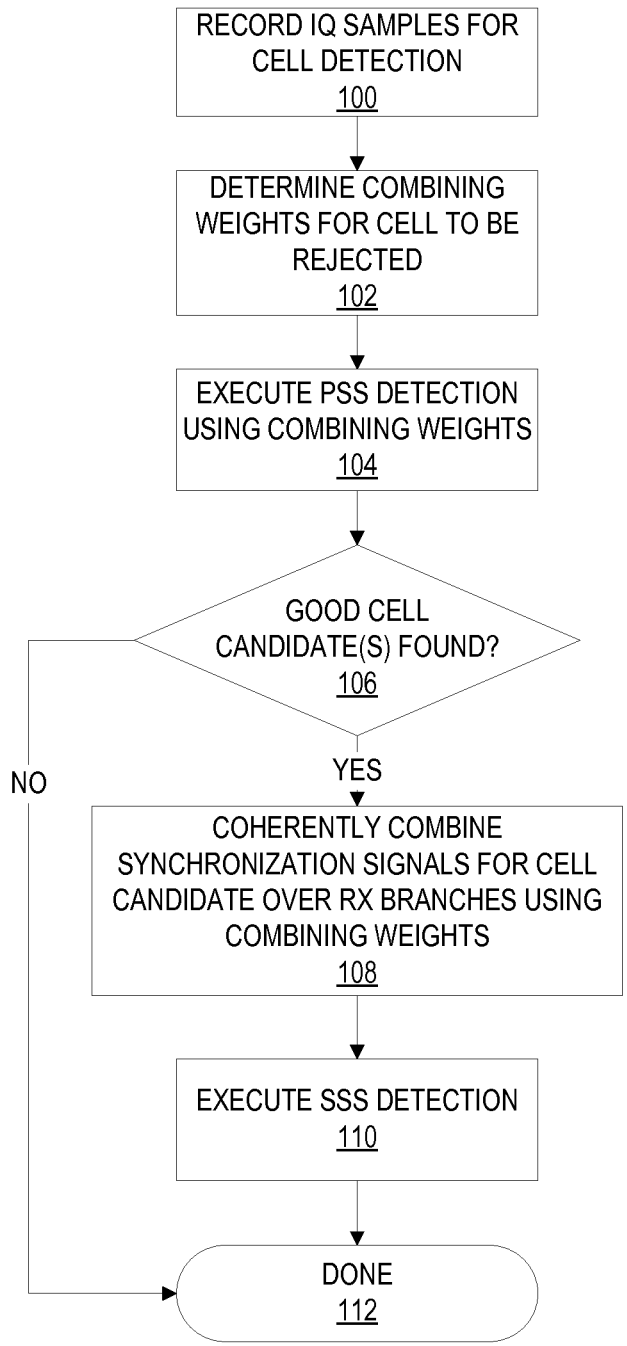
FIG. 4 is a flow chart that illustrates a process for cell detection that utilizes cell or interference rejection according to some embodiments of the present disclosure.

A cell detection procedure that utilizes this interference rejection scheme is illustrated in FIG. 4. As illustrated, In-phase Quadrature Phase (IQ) samples are acquired for an appropriate amount of time (e.g., 5-6 milliseconds (ms)) and stored in memory (step 100). Notably, by storing, or buffering, the IQ samples, the IQ samples can be spatially filtered for cell detection without impacting the ability to using non-spatially filtered IQ samples for normal signal processing (e.g., the reception of desired signal(s) from the serving cell(s)).

The SSS of the cell(s) to be rejected are localized in the recorded data and used for estimation of the radio channels of the cell(s) to be rejected. The channel estimates are used for forming one or more sets of combining weights (as discussed above) which, when applied to the received signals, suppress the cell(s) to be rejected (step 102). In other words, the set(s) of combining weights for spatially filtering (also referred to herein as suppressing, rejecting, or blocking) transmissions from a perceived direction of a previously detected strong cell to be rejected are determined. As discussed above, the set(s) of combining weights are determined based on the estimated radio propagation channel for the previously detected strong cell based on known or predetermined transmissions (e.g., SSS transmission) from that cell. As described herein, the cell to be rejected is a function of, or depends on, whether the UE is determined to be approaching or leaving its current serving cell (which is also referred to herein as approaching or leaving the site or source of transmissions for its current serving cell).

PSS detection is carried out, where IQ samples from the receive branches are filtered using filters matching PSS, weighted and accumulated coherently before taking the magnitude-square of the combined filter outputs, as discussed above. Peaks, indicative of cell candidates, are detected (step 104). In other words, PSS detection is executed using the set(s) of combining weights determined in step 102. During PSS detection, the IQ samples from the N receive antennas are combined according to the set(s) of combining weights determined in step 102 such that transmissions from the perceived directions of the cell to be rejected are spatially filtered. PSS detection is then performed based on the resulting combined signal(s).

In case good cell candidates have been found in the PSS detection, as can be determined from conventional metrics (step 106; YES), the OFDM symbols corresponding to synchronization signals of the cell candidate are localized and combined using the set of combining weights associated with the detected peak (when M>1) (step 108). The weights may be identical to the weights used in the PSS detection (e.g., a single weight for the whole bandwidth), or a new set of weights with finer granularity (per sub-band or even subcarrier) may be derived. SSS detection is carried out using the combined signals (step 110). Thereafter the procedure is finished for this measurement occasion (step 112).

In case a good cell was not found (step 106; NO), the cell detection is terminated (step 112) without attempting to detect a SSS.

Returning to the detection of whether the UE is travelling towards or away from the serving cell, the UE can, for instance, detect or determine this based on either one or a combination of:

Measured time drift of the serving cell. When approaching the cell, the trend of the time drift will have the opposite sign to the one for the trend when the UE is moving away from the cell.

Measured Reference Signal Received Power (RSRP) of the serving cell. When approaching the cell RSRP increases, and when moving away from the cell it decreases.

Detected Doppler frequency shift. When the UE passes the serving cell site there is a change of sign for the frequency offset, and the closer to the track the serving cell site is located, the more abrupt the change from positive to negative frequency offset.

In RRC Connected state, the UE can also make use of the eNB timing advance commands which reflects the distance from the UE to the cell. When approaching the cell, the timing advance decreases and vice versa. Channel Quality Index (CQI) or SINR can be indicative in the same fashion as RSRP, since when approaching the cell the SINR, hence the channel quality, will increase. In case geographic information on the network layout is available and the UE, e.g., is using Global Positioning System (GPS) or other means for positioning, this information, too, can be used for determining whether the UE is approaching or leaving the serving cell. In case the UE stores particular history information it may use finger printing techniques to determine the position of the UE relative to the serving cell and can exploit such information when determining whether leaving or approaching the serving cell.

Figure 5:
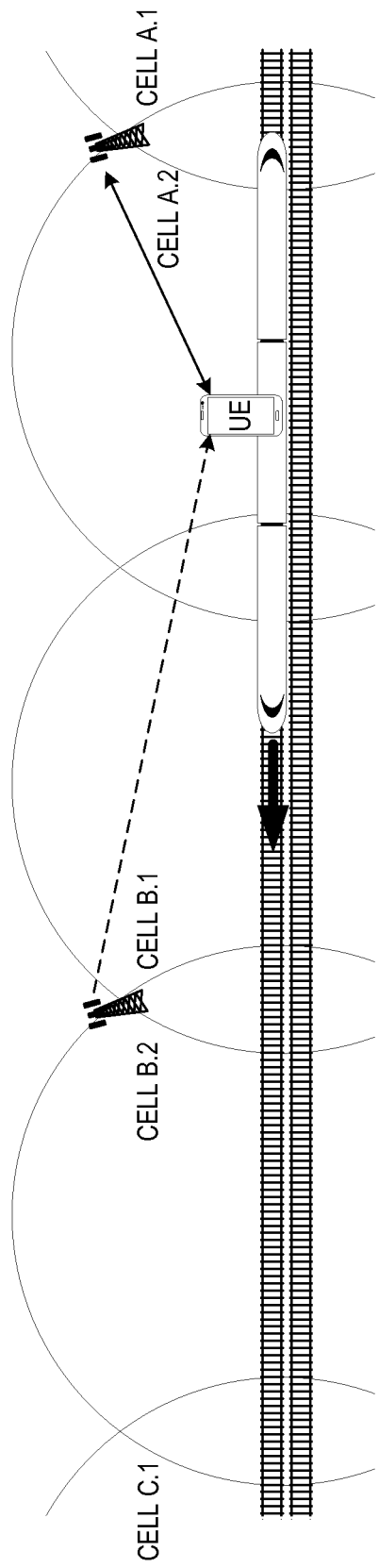
FIG. 5 illustrates Doppler shift experienced by a UE traveling on a high speed train according to some embodiments of the present disclosure.
Figure 5:
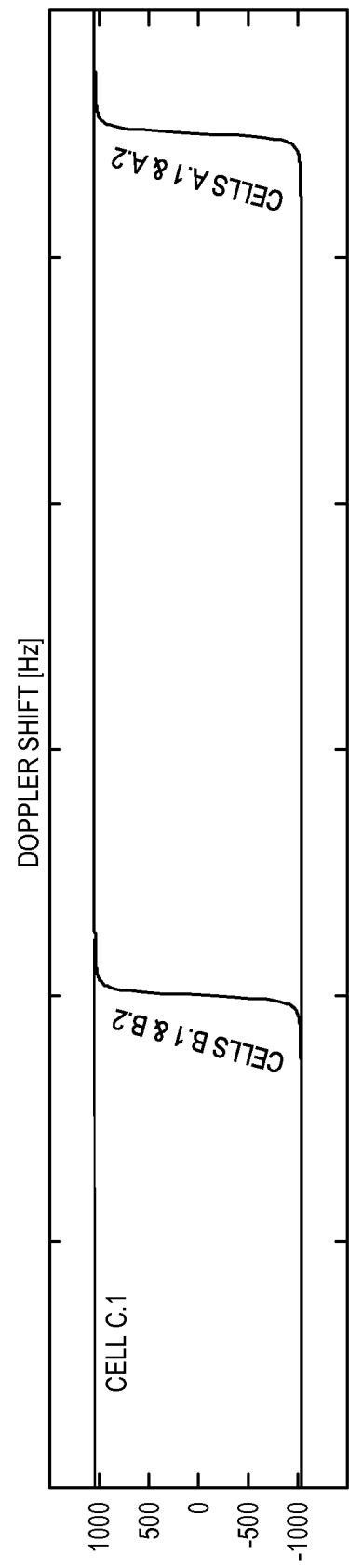

For a serving cell site far away from the track (which can be deduced by the UE for instance by analyzing the downlink pathloss or timing advance), it is not likely that there will be a distinct change in frequency offset and, hence, RSRP or time drift may be more reliable than Doppler shift detection when determining whether the serving cell site is ahead or behind the UE. However, for a serving cell site close to the track, the sign of the frequency offset will change very rapidly and here it is more reliable to use Doppler shift detection as the means to quickly determine that the UE now has passed the serving cell site; see FIG. 5. The chart of FIG. 5 illustrates a Doppler shift (in Hertz (Hz) on the y-axis) experienced by a UE travelling at 450 km/h and passing antenna sites (2.5 Gigahertz (GHz) band, antennas 20 meters (m) from the track).

Figure 6:
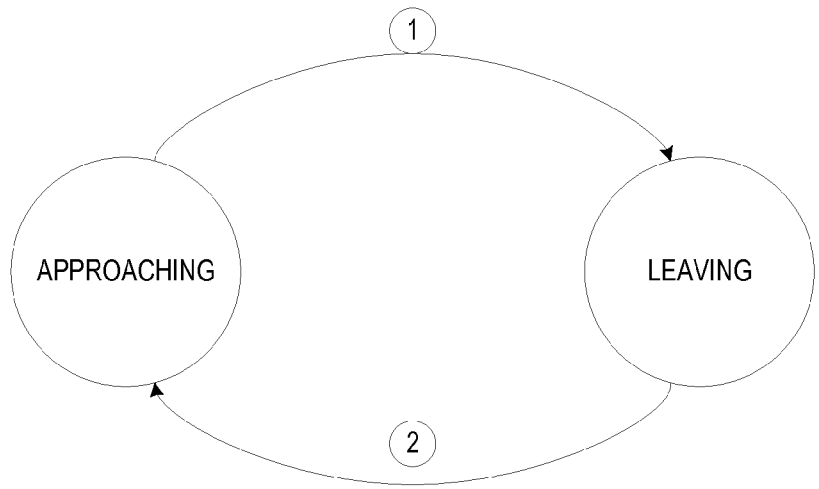
FIG. 6 is a state diagram that illustrates a state maintained by a UE as either leaving or approaching a serving cell of the UE according to some embodiments of the present disclosure.

In some embodiments, the UE maintains a state on whether approaching or leaving the serving cell, as illustrated in FIG. 6, and may transition between the states if, for example, either or both of the RSRP trend detector and the Doppler shift detector have indicated that there has been a change. If in the Approaching state and the Doppler shift detector indicates that there has been a switch from positive to negative frequency offset, and/or the RSRP trend detector indicates that the RSRP has switched from rising to falling levels, the state is changed to Leaving, as illustrated in FIG. 6, state change 1. If in the Leaving state and the Doppler shift detector indicates that there has been a switch from positive to negative frequency offset, and/or the RSRP trend detector indicates that the RSRP has switched from falling to rising levels, the state is changed to Approaching, as illustrated in FIG. 6, state change 2. The state is preserved during handover and cell reselection, and transitions are triggered based on the characteristics of the new serving cell. It shall be noted that it cannot be assumed that a handover will cause the UE to go to the Approaching state; it is fully depending on the network layout.

Figure 7:
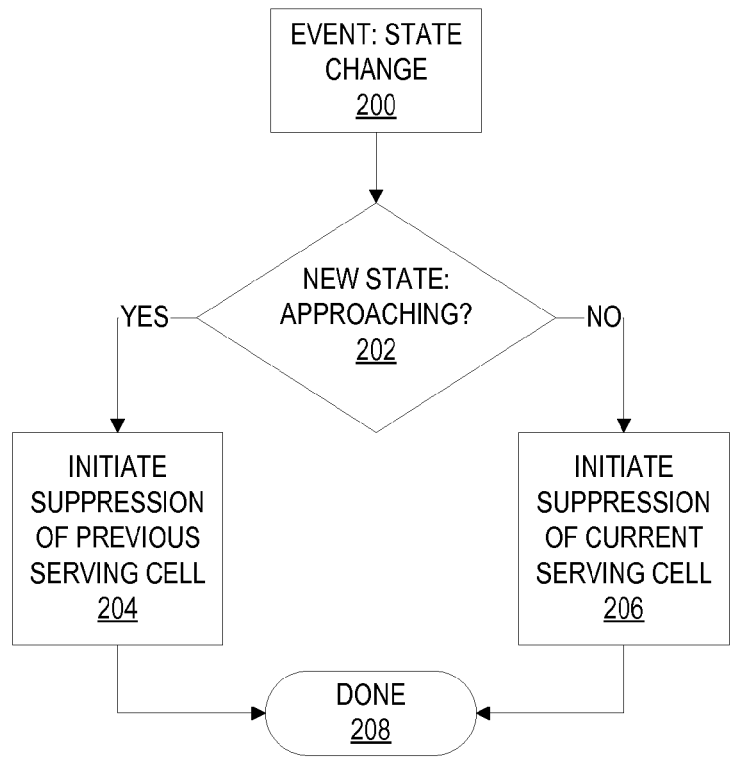
FIG. 7 is a flow chart that illustrates the operation of a UE to suppress or reject the transmissions from either a current serving cell of the UE or a previous serving cell of the UE depending on whether the UE is leaving or approaching the current serving cell of the UE according to some embodiments of the present disclosure.

The actions upon state change are illustrated in the flow chart of FIG. 7. In particular, FIG. 7 illustrates the operation of the UE to initiate, and therefore perform, suppression of transmissions from either a previous serving cell of the UE or a current serving cell of the UE depending on whether the UE is in the Approaching state or the Leaving state. As illustrated, when a state change occurs (step 200) and the state is changed to Approaching (step 202; YES), the UE reconfigures the interference rejection to suppress the transmissions from the previous serving cell (step 204). As a result, when, for example, performing the cell detection procedure of FIG. 4, the UE will suppress interference transmissions from the previous serving cell of the UE during cell detection. If the state instead changes to Leaving (step 202; NO), the UE reconfigures to suppress the current serving cell (step 206). As a result, then performing the cell detection procedure of FIG. 4, the UE will suppress interference from the current serving cell of the UE during cell detection. Once the suppression of either the previous or current serving cell is completed, the process ends (step 208).

Note, however, that the present disclosure is not limited to cell detection. The interference rejection may be used to suppress the transmissions from the previous serving cell (step 204) or the current serving cell (step 206) during detection of any suitable predetermined signal known to the UE. In some embodiments, the predetermined signal known to the UE is a synchronization signal (e.g., PSS detection or SSS), a discovery signal (e.g., a discovery signal used for License-Assisted Access (LAA)), a reservation signal (e.g., a reservation signal used for LAA), or a reference signal.

Figure 8:
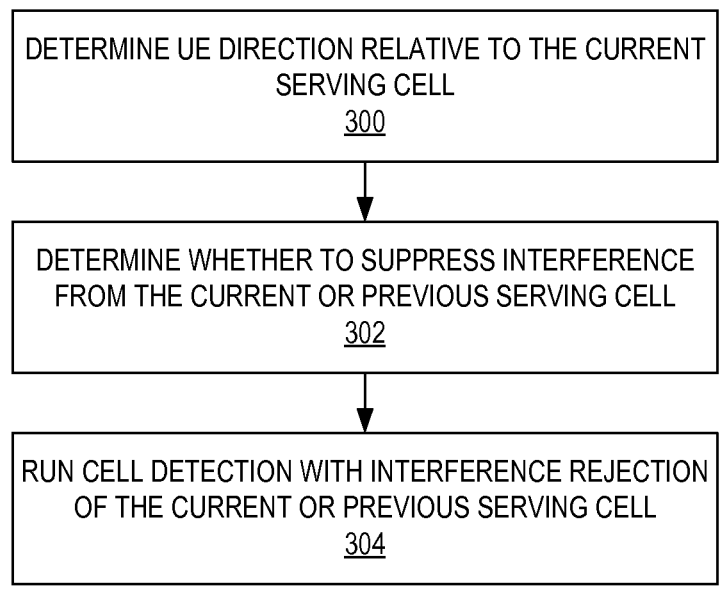
FIG. 8 is a flow chart that illustrates the operation of a UE to suppress or reject the transmissions from either a current serving cell of the UE or a previous serving cell of the UE according to some embodiments of the present disclosure.

FIG. 8 illustrates a cell detection process according to some embodiments of the present disclosure. As illustrated, the UE first determines the direction of movement of the UE relative to the current serving cell (or site of the current serving cell) of the UE as, for example, discussed above (step 300). The UE then determines whether to suppress transmissions from the current serving cell of the UE or the previous serving cell of the UE based on the direction of movement of the UE relative to the current serving cell (step 302). Then, in this example, the UE runs a cell detection process while performing interference rejection for transmissions from the current or previous serving cell of the UE as determined in step 302 (step 304).

In a second aspect of the present disclosure, the UE uses information on whether approaching or leaving the serving cell to compensate recorded IQ samples for frequency offsets when executing cell detection, cell tracking, and cell measurements.

European Patent Application No. EP 2 360 967 A1 entitled A METHOD FOR COMMUNICATING IN A WIRELESS COMMUNICATION NETWORK includes a frequency offset compensation for measurements, etc. However, this aspect of the present disclosure is not about Doppler estimation as such, but about which two hypotheses to investigate regarding the frequency offset of a yet-to-be-detected cell. The decision on whether to suppress transmissions (interference) from the serving cell or the previous serving cell depends on whether the serving cell is behind or in front of the UE (i.e., whether the UE is approaching or leaving the serving cell), something that can be determined as outlined for the first aspect above.

The UE tunes its radio receiver to match the perceived downlink carrier frequency of the serving cell. Hence, when approaching the serving cell, there is a positive Doppler shift of the UE demodulation frequency relative to the actual frequency used by the network. In contrast, when leaving the serving cell, there is a negative Doppler shift. This tuning is handled by, e.g., conventional AFC functionality.

When the UE is searching for new cells while approaching the serving cell, the UE may come into coverage of a neighbor cell which is transmitting in a beam in the same direction as the UE is moving. Hence, the UE is moving away from the cell once it comes into coverage, and there is twice the Doppler shift between the UE demodulation frequency and the perceived frequency of the neighbor cell. However, new cells that transmit in the direction towards the UE are perceived as having the same carrier frequency as the UE demodulation frequency.

Since a frequency offset in the range of several kilohertz (kHz) degrades the sensitivity of the SSS detection, the UE may compensate for such offset when carrying out cell detection (and also other processing such as cell tracking and mobility measurements). Concretely, when searching for neighbor cells while approaching the serving cell, the UE hypothesizes (1) that there is no frequency offset compared to serving cell, and (2) that there is a negative frequency offset comprising twice the Doppler shift. The first hypothesis is covered by executing the cell detection using the recorded IQ samples as is, whereas the second hypothesis is covered by digitally shifting the frequency of the recorded IQ samples to compensate for the shift potentially caused by Doppler when executing cell detection.

When the UE is moving away from the serving cell, it is the other way around, and the UE may hypothesize (1) that there is no frequency offset compared to the serving cell, and (2) that there is positive frequency offset comprising twice the Doppler shift.

The UE may estimate the Doppler shift by accumulating the frequency corrections carried out within some interval of time, to capture the rapid changes in UE demodulation frequency as illustrated in FIG. 5, or may estimate the shift from the Doppler spread (which requires reflection from multiple angles; hence, this is mostly applicable in urban areas). The UE may alternatively use a fixed assumption on the magnitude of the shift, e.g., 2 kHz or some figure that has been derived from maximum supported speed and the operating frequency band, or has been provided, e.g., by the operator or a third party source.

Figure 9:
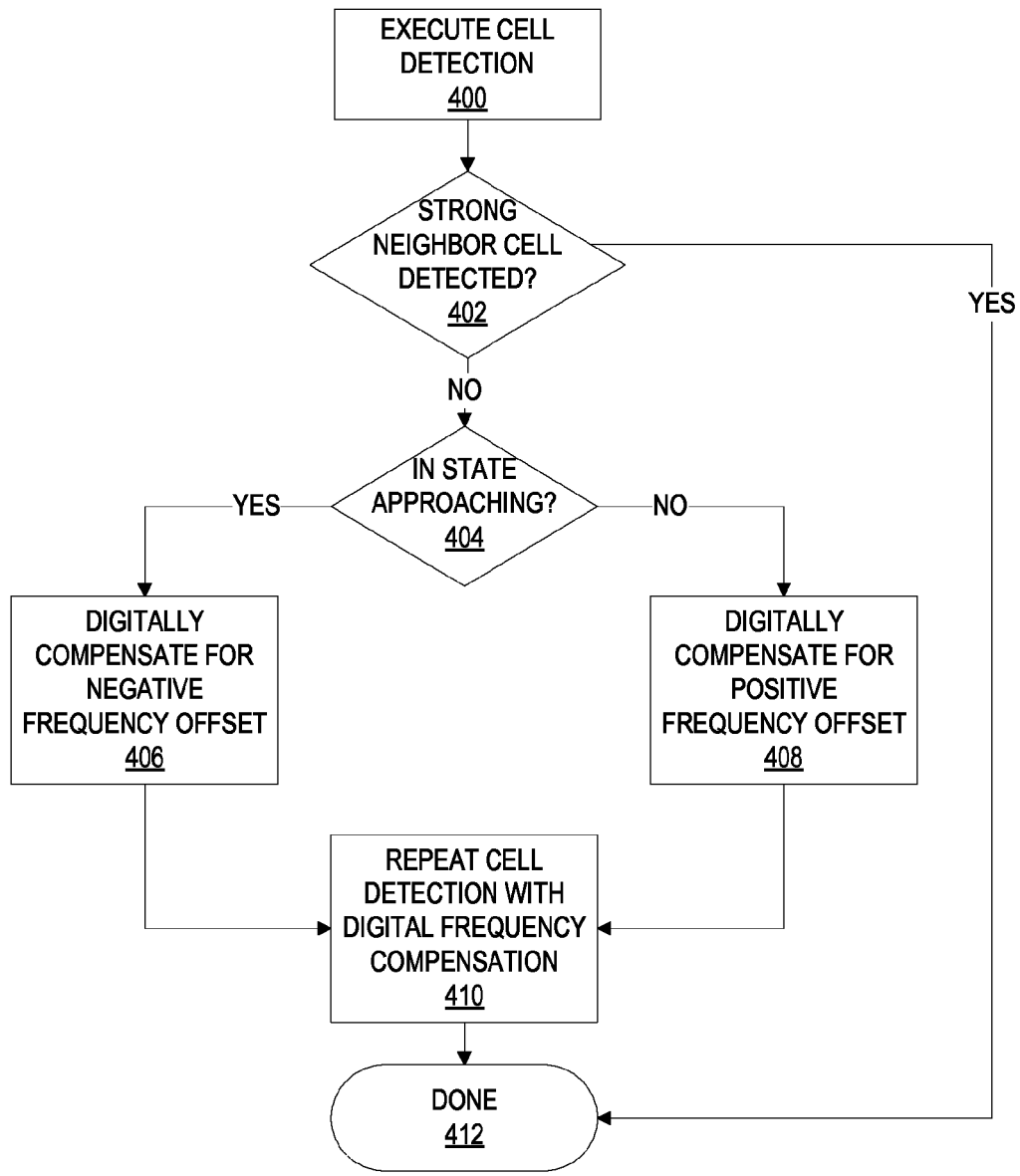
FIG. 9 is a flow chart that illustrates the operation of a UE to digitally compensate for Doppler shift based on whether the UE is approaching or leaving a current serving cell of the UE according to some embodiments of the present disclosure.

The cell detection with frequency compensation is illustrated in FIG. 9. When carrying out cell detection in high Doppler shifts, the UE may run cell detection, as for instance outlined in FIG. 4, both for the UE demodulation frequency, i.e., the frequency at which it receives the serving cell (step 400), and in case the UE failed to identify a neighbor cell of good quality (e.g., determined by means of SINR, RSRP, and/or Reference Signal Received Quality (RSRQ) and similar metrics) (step 402; NO), for a slightly offset frequency. The UE determines (step 404) whether the UE is approaching or leaving the serving cell as described earlier. In case the UE is approaching the serving cell (step 404; YES), the UE digitally compensates for twice the negative Doppler shift (step 406) and then repeats the cell detection with this compensation (step 410). Otherwise, when the UE is leaving the serving cell (step 404; NO), the UE digitally compensates for twice the positive Doppler shift relative to the UE demodulation frequency (step 408) and then repeats the cell detection with this compensation (step 410). The process is then complete (step 412). If the UE detects a neighbor cell of good quality (step 402; YES), the process is complete (step 412). Whether to execute steps 404-410 also depends on what scenario the UE encounters—either by detecting it autonomously (also including usage of UE history), getting information about it from the network, getting information from a third party source, or by the mode being set via a UE user interface.

Figure 10:
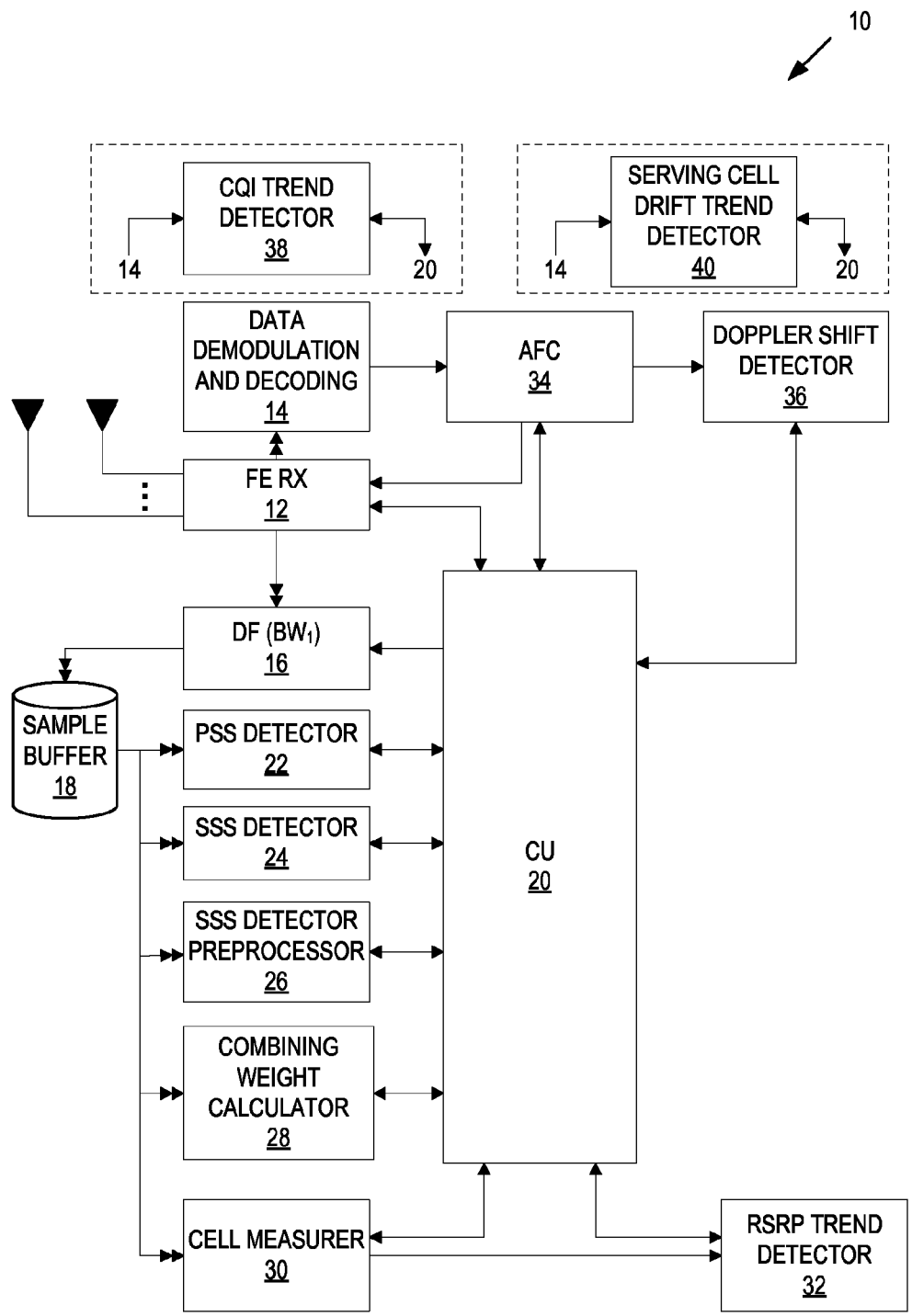
FIG. 10 is a block diagram of a cell detection apparatus according to some embodiments of the present disclosure.

FIG. 10 illustrates a cell detection apparatus 10 according to some embodiments of the present disclosure. The cell detection apparatus 10 is implemented within the UE or any other wireless device desiring to perform cell detection according to the embodiments described herein. As illustrated, the cell detection apparatus 10 includes two or more receive antennas that are connected to a radio Front-End Receiver (FE RX) unit 12 (e.g., the radio front-end of the UE). The received signals are passed on to a data demodulation and decoding unit 14, and for the purpose of RRM through a Digital Filter (DF) 16 narrowing down the signal bandwidth and sampling rate to the bandwidth of interest for mobility measurements (usually equivalent with the smallest EUTRA system downlink bandwidth). The received samples are stored in a sample buffer 18, i.e. memory, for further processing. The radio front-end receiver unit 12 and the digital filter 16 are both controlled by a Control Unit (CU) 20.

The cell detection apparatus 10 further consists of RRM-related functionality: a PSS detection unit, or PSS detector, 22 typically realized in hardware, a SSS detection unit, or SSS detector, 24, and a SSS detector preprocessor 26 typically realized in software, e.g. software executed by at least one processor such as, e.g., at least one Central Processing Unit (CPU), Application Specific Integrated Circuit (ASIC), or Field Programmable Gate Array (FPGA)), a weight calculator unit, or combining weight calculator, 28 typically realized in software (e.g., software executed by at least one processor), a cell measurement unit, or cell measurer, 30 typically realized in software (e.g., software executed by at least one processor), and a RSRP trend detector 32 typically realized in software (e.g., software executed by at least one processor), all of which are controlled by the control unit 20. While not essential, for more information regarding the PSS detection unit 22, the SSS detection unit 24, the SSS detector preprocessor 26, and the weight calculator unit 28, the interested reader is directed to U.S. Provisional Patent Application Ser. No. 62/110,166. In general, the PSS detection unit 22 operates to combine the signals received from the N receive antennas using the set(s) of combining weights to thereby reject transmissions from the perceived direction of the current or previous serving cell of the UE depending on whether the UE is leaving or approaching the current serving cell. The resulting signal is then used for PSS detection e.g., in the conventional manner (e.g., using a PSS matched filter, peak detection, etc.). Combining weights are calculated by the weight calculator unit 28 as described above, and provided to the SSS detector preprocessor 26. The SSS detector preprocessor 26 applies a set(s) of weights to spatially filter transmissions from the current or previous serving cell to provide a signal to use for SSS detection. SSS detection can then proceed in, e.g., the conventional manner.

Moreover, the cell detection apparatus 10 includes functionality to support data demodulation and decoding (e.g., the data demodulation and decoding unit 14), an AFC 34, and a Doppler shift detector 36. As mentioned above, one may also include a CQI trend detector 38 and/or a serving cell drift trend detector 40, either to replace, e.g., the RSRP trend detector 32 or to broaden the decision base regarding state transitions (Approaching or Leaving the serving cell). Configuration and control of said units are handled by the control unit 20.

Embodiments are disclosed herein that enable a UE to decide which cell to suppress in a high speed train scenario to improve the cell detection for relevant handover or cell reselection candidates. Moreover, embodiments of the present disclosure enable a UE to decide which frequency offsets to take into account in the cell detection, thereby further increasing and improving the sensitivity. The increased cell detection performance reduces the risk for Radio Link Failure (RLF) due to late handover or missed pages/paging signals from a network node/base station/eNB due to late cell reselection.

While not being limited to any particular benefit or advantage, the embodiments disclosed herein provide a number of benefits and advantages over conventional cell detection schemes. For example, when in RRC Connected mode, the UE can identify relevant cell(s) for handover earlier and will thereby allow sufficient time for the network to prepare handover. This reduces the risk for RLF or dropped calls while traveling at high speed. When in the RRC Idle mode, the UE can earlier identify relevant cell(s) to camp on, and can thereby evaluate cell reselection earlier. This opens up for more tuning possibilities for the network with respect to cell reselection thresholds. This reduces the risk of the UE missing pagings when traveling at high speed.

Figure 11:
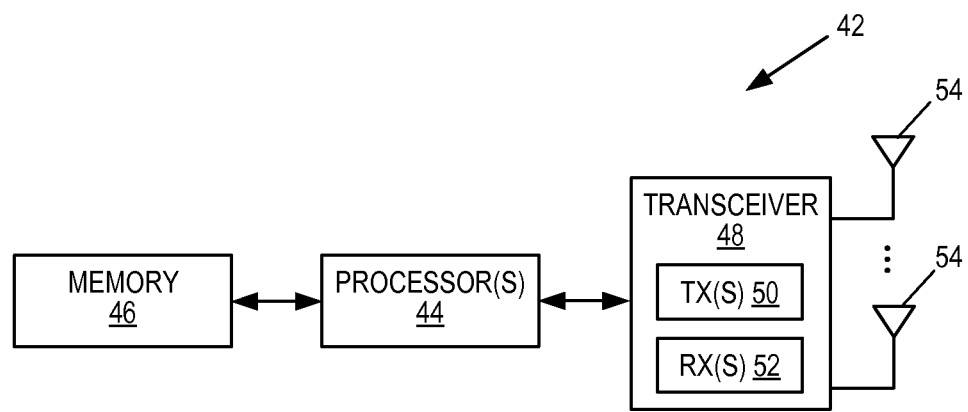
FIG. 11 is a block diagram of a UE according to some embodiments of the present disclosure.

FIG. 11 illustrates a UE 42 according to some embodiments of the present disclosure. As illustrated, the UE 42 includes one or more processors 44 (e.g., CPU(s), ASIC(s), FPGA(s)), memory 46, and a transceiver 48 including one or more transmitters 50 and one or more receivers 52 connected to a number of antennas 54. As discussed above, in some embodiments, at least some components of the cell detection apparatus 10 of FIG. 10 are implemented in software. This software may be stored in the memory 46 and executed by the processor(s) or processor circuits 44, whereby the UE 42 operates to provide the corresponding functionality. As also discussed above, in some embodiments, at least some of the components of the cell detection apparatus 10 of FIG. 10 are implemented in hardware. This hardware may be included within the processor(s) 44 (e.g., a hardware signal processor) or may be external to the processor(s) 44 (not shown).

In some embodiments, a computer program including instructions which, when executed by at least one processor, causes the at least one processor to carry out the functionality of the cell detection apparatus 10 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 46).

The present disclosure relates to systems and methods for improving cell detection that are particularly suitable for, e.g., a high speed train scenario, but are not necessarily limited thereto. For instance, the embodiments described herein may be applied in any suitable scenario (e.g., in a very dense small cell scenario where a UE transitions between cells quickly and/or when there is line of sight and a high Doppler shift due to either high UE velocity, high carrier frequency, or both). Embodiments of a method of operation of a wireless device (e.g., a UE) in a cellular communications network are disclosed. In some embodiments, the method of operation of the wireless device includes determining whether the wireless device is approaching a site of a serving cell of the wireless device or leaving (i.e., moving away from) the site of the serving cell of the wireless device. The method of operation of the wireless device further includes initiating suppression of transmissions from a previous serving cell of the wireless device, e.g., when performing cell detection, if the wireless device is approaching the site of the serving cell of the wireless device. Conversely, the method of operation of the wireless device further includes initiating suppression of transmissions from of the (current) serving cell of the wireless device, e.g., when performing cell detection, if the wireless device is leaving the site of the serving cell of the wireless device. In this manner, cell detection is improved since the transmissions (interference) from a strong cell that the UE will not be handed over to next, is partially or fully suppressed.

In some embodiments, the method of operation of the wireless device further includes determining whether the wireless device is in a high speed train scenario and performing the aforementioned steps in response to the wireless device being in the high speed train scenario.

Further, in some embodiments, the method of operation of the wireless device further includes maintaining a state of the wireless device, where the state is indicative of whether the wireless device is approaching or leaving the site of the serving cell of the wireless device.

Embodiments of a method of operation of a wireless device that adjust a Doppler shift utilized for cell detection (e.g., in a high speed train scenario) depending on whether the wireless device is approaching or leaving a site of a serving cell of the wireless device are also disclosed. In some embodiments, the method of operation of the wireless device includes determining whether the wireless device is approaching or leaving a site of a serving cell of the wireless device and performing cell detection with a digital frequency compensation that:

compensates for a negative frequency offset if the wireless device is approaching the site of the serving cell of the wireless device or compensates for a positive frequency offset if the wireless device is leaving the site of the serving cell of the wireless device. In some embodiments, the (positive or negative) frequency offset is two times a Doppler shift of the serving cell of the wireless device. In some embodiments, the method further includes performing the cell detection without the (positive or negative) frequency offset.

Embodiments of a wireless device that operates according to the methods disclosed herein are also disclosed.

The following acronyms are used throughout this disclosure.

3GPP 3$^{rd}$ Generation Partnership Project
AFC Automatic Frequency Control
ASIC Application Specific Integrated Circuit
CPU Central Processing Unit
CQI Channel Quality Index
CU Control Unit
DF Digital Filter
eNB Enhanced or Evolved Node B
EUTRA Enhanced Universal Terrestrial Radio Access
EUTRAN Enhanced Universal Terrestrial Radio Access Network
FDD Frequency Division Duplex
FE RX Front-End Receiver
FPGA Field Programmable Gate Array
GHz Gigahertz
GPS Global Positioning System Hz Hertz
ID Identity
IQ In-phase Quadrature Phase
kHz Kilohertz
km/h Kilometers per Hour
LAA License-Assisted Access
LTE Long Term Evolution
m Meter
MBSFN Multi-Broadcast Single-Frequency Network
MHz Megahertz
MIB Master Information Block
ms Millisecond
OFDM Orthogonal Frequency Division Multiplexing
PBCH Physical Broadcast Channel
PCell Primary Cell
PSCell Primary Secondary Sell
PSS Primary Synchronization Signal
RAN Radio Access Network
RLF Radio Link Failure
RRC Radio Resource Control
RRH Remote Radio Head
RRM Radio Resource Management
RS Reference Signal
RSRP Reference Signal Received Power
RSRQ Reference Signal Received Quality
SCell Secondary Cell
SINR Signal to Interference plus Noise Ratio
SSS Secondary Synchronization Signal
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device comprising:
    determining whether the wireless device is moving toward a current serving cell of the wireless device or away from the current serving cell of the wireless device;
    if the wireless device is moving toward the current serving cell, initiating, at the wireless device, suppression of transmissions from a previous serving cell of the wireless device during detection of a predetermined signal from a cell ahead of the current serving cell; and
    if the wireless device is moving away from the current serving cell, initiating, at the wireless device, suppression of transmissions from the current serving cell of the wireless device during detection of a predetermined signal from the cell ahead of the current serving cell.

2. The method of claim 1 wherein:
    initiating suppression of transmissions from the previous serving cell of the wireless device during detection of the predetermined signal from the cell ahead of the current serving cell comprises initiating suppression of transmissions from a perceived direction of the previous serving cell of the wireless device during detection of the predetermined signal from the cell ahead of the current serving cell; and
    initiating suppression of transmissions from the current serving cell of the wireless device during detection of the predetermined signal from the cell ahead of the current serving cell comprises initiating suppression of transmissions from a perceived direction of the current serving cell of the wireless device during detection of the predetermined signal from the cell ahead of the current serving cell.

3. The method of claim 2 wherein the predetermined signal is one of a group consisting of: a synchronization signal, a discovery signal, a reservation signal, and a reference signal.

4. The method of claim 1 wherein determining whether the wireless device is moving toward the current serving cell of the wireless device or away from the current serving cell of the wireless device comprises determining a direction of movement of the wireless device relative to the current serving cell of the wireless device based on at least one of a group consisting of:
    a measured time drift of the current serving cell;
    a measured reference signal received power of the current serving cell;
    a channel quality indicator for the current serving cell;
    a signal to interference plus noise ratio for the current serving cell;
    a detected Doppler frequency shift of the current serving cell; and
    one or more timing advance commands received from a base station controlling the current serving cell.

5. The method of claim 1 wherein determining whether the wireless device is moving toward the current serving cell of the wireless device or away from the current serving cell of the wireless device comprises determining a direction of movement of the wireless device relative to the current serving cell of the wireless device based on at least one of a group consisting of:
    a location of the wireless device as determined via a positioning system; and
    historical information.

6. The method of claim 1 wherein:
    initiating suppression of transmissions from the previous serving cell of the wireless device during detection of the predetermined signal from the cell ahead of the current serving cell comprises running a cell detection procedure with interference suppression of transmissions from the previous serving cell of the wireless device if the wireless device is moving toward the current serving cell; and
    initiating suppression of transmissions from the current serving cell of the wireless device during detection of the predetermined signal from the cell ahead of the current serving cell comprises running the cell detection procedure with interference suppression of transmissions from the current serving cell of the wireless device if the wireless device is moving away from the current serving cell.

7. The method of claim 1 further comprising:
    determining whether the wireless device is in a high speed train scenario; and
    upon determining that the wireless device is in a high speed train scenario, performing the steps determining whether the wireless device is moving toward the current serving cell of the wireless device or away from the current serving cell of the wireless device, initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

8. The method of claim 1 further comprising:
detecting a change of a state of the wireless device, the state of the wireless device being maintained as either moving toward the current serving cell of the wireless device or away from the current serving cell of the wireless device based on a direction of movement of the wireless device relative to the current serving cell of the wireless device; and
upon detecting a change of the state of the wireless device, performing the steps determining whether the wireless device is moving toward the current serving cell of the wireless device or away from the current serving cell of the wireless device, initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

9. The method of claim 1 wherein:
determining whether the wireless device is moving toward the current serving cell of the wireless device or away from the current serving cell of the wireless device comprises determining that the wireless device is moving away from the current serving cell of the wireless device; and
initiating suppression of transmissions from the current serving cell of the wireless device during detection of the predetermined signal from the cell ahead of the current serving cell is performed upon determining that the wireless device is moving away from the current serving cell of the wireless device;
wherein the method further comprises, after performing an intra-frequency handover from the current serving cell to a new current serving cell, continuing to suppress transmission from the current serving cell of the wireless device during detection of the predetermined signal from the cell ahead of the current serving cell while the wireless device is moving toward the new current serving cell.

10. The method of claim 1 further comprising:
if the wireless device is moving toward the current serving cell, compensating for a negative frequency offset during cell detection; and
if the wireless device is moving away from the current serving cell, compensating for a positive frequency offset during cell detection.

11. The method of claim 10 wherein cell detection comprises detecting a secondary synchronization signal such that:
compensating for the negative frequency offset during cell detection comprises compensating for the negative frequency offset during detection of the secondary synchronization signal; and
compensating for the positive frequency offset during cell detection comprises compensating for the positive frequency offset during detection of the secondary synchronization signal.

12. The method of claim 10 wherein the negative frequency offset is equal to −2 times a Doppler shift of a serving cell of the wireless device, and the positive frequency offset is equal to +2 times the Doppler shift of the serving cell of the wireless device.

13. The method of claim 12 further comprising:
repeating cell detection using the Doppler shift of the serving cell of the wireless device.

14. A wireless device enabled to provide interference suppression during detection of a predetermined signal, comprising:
receiver circuitry coupled to two or more receive antennas;
one or more processors; and
memory containing software executable by the one or more processors whereby the wireless device is operative to:
determine whether the wireless device is moving toward a current serving cell of the wireless device or away from the current serving cell of the wireless device;
if the wireless device is moving toward the current serving cell, initiate suppression of transmissions from a previous serving cell of the wireless device during detection of a predetermined signal from a cell ahead of the current serving cell; and
if the wireless device is moving away from the current serving cell, initiate suppression of transmissions from the current serving cell of the wireless device during detection of a predetermined signal from the cell ahead of the current serving cell.

15. The wireless device of claim 14 wherein:
in order to initiate suppression of transmissions from the previous serving cell of the wireless device during detection of the predetermined signal from the cell ahead of the current serving cell, the wireless device is further operative to initiate suppression of transmissions from a perceived direction of the previous serving cell of the wireless device during detection of the predetermined signal from the cell ahead of the current serving cell; and
in order to initiate suppression of transmissions from the current serving cell of the wireless device during detection of the predetermined signal from the cell ahead of the current serving cell, the wireless device is further operative to initiate suppression of transmissions from a perceived direction of the current serving cell of the wireless device during detection of the predetermined signal from the cell ahead of the current serving cell.

16. The wireless device of claim 15 wherein the predetermined signal is one of a group consisting of: a synchronization signal, a discovery signal, a reservation signal, and a reference signal.

17. The wireless device of claim 14 wherein, via execution of the software by the one or more processors, the wireless device is further operative to:
determine whether the wireless device is in a high speed train scenario; and
upon determining that the wireless device is in a high speed train scenario, perform the functions determining whether the wireless device is moving toward the current serving cell of the wireless device or away from the current serving cell of the wireless device comprising initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

18. The wireless device of claim 14 wherein via execution of the software by the one or more processors the wireless device is further operative to:
   detect a change of a state of the wireless device, the state of the wireless device being maintained as either moving toward the current serving cell of the wireless device or away from the current serving cell of the wireless device based on a direction of movement of the wireless device relative to the current serving cell of the wireless device; and
   upon detecting a change of the state of the wireless device, perform the functions determining whether the wireless device is moving toward the current serving cell of the wireless device or away from the current serving cell of the wireless device comprising initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

19. The wireless device of claim 14 wherein, via execution of the software by the one or more processors, the wireless device is further operative to:
   if the wireless device is moving toward the current serving cell, compensate for a negative frequency offset during cell detection; and
   if the wireless device is moving away from the current serving cell, compensate for a positive frequency offset during cell detection.

20. The wireless device of claim 19 wherein cell detection comprises detecting a secondary synchronization signal such that:
   if the wireless device is moving toward the current serving cell, the wireless device compensates for the negative frequency offset during detection of the secondary synchronization signal; and
   if the wireless device is moving away from the current serving cell, the wireless device compensates for the positive frequency offset during detection of the secondary synchronization signal.

21. The wireless device of claim 19 wherein the negative frequency offset is equal to −2 times a Doppler shift of a serving cell of the wireless device, and the positive frequency offset is equal to +2 times the Doppler shift of the serving cell of the wireless device.

22. The wireless device of claim 21 wherein via execution of the software by the one or more processors the wireless device is further operative to:
   repeat cell detection using the Doppler shift of the serving cell of the wireless device.

23. A wireless device enabled to provide interference suppression during detection of a predetermined signal, comprising:
   front-end receiver circuitry coupled to two or more receive antennas;
   circuitry operative to:
      determine whether the wireless device is moving toward a current serving cell of the wireless device or away from the current serving cell of the wireless device;
      if the wireless device is moving toward the current serving cell, initiate suppression of transmissions from a previous serving cell of the wireless device during detection of a predetermined signal from a cell ahead of the current serving cell; and
      if the wireless device is moving away from the current serving cell, initiate suppression of transmissions from the current serving cell of the wireless device during detection of a predetermined signal from the cell ahead of the current serving cell.

24. The wireless device of claim 23 wherein:
   in order to initiate suppression of transmissions from the previous serving cell of the wireless device during detection of the predetermined signal from the cell ahead of the current serving cell, the circuitry is further operative to initiate suppression of transmissions from a perceived direction of the previous serving cell of the wireless device during detection of the predetermined signal from the cell ahead of the current serving cell; and
   in order to initiate suppression of transmissions from the current serving cell of the wireless device during detection of the predetermined signal from the cell ahead of the current serving cell, the circuitry is further operative to initiate suppression of transmissions from a perceived direction of the current serving cell of the wireless device during detection of the predetermined signal from the cell ahead of the current serving cell.

25. The wireless device of claim 24 wherein the predetermined signal is one of a group consisting of: a synchronization signal, a discovery signal, a reservation signal, and a reference signal.

26. The wireless device of claim 23 wherein the circuitry is further operative to:
   determine whether the wireless device is in a high speed train scenario; and
   upon determining that the wireless device is in a high speed train scenario, perform the functions determining whether the wireless device is moving toward the current serving cell of the wireless device or away from the current serving cell of the wireless device comprising initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

27. The wireless device of claim 23 wherein the circuitry is further operative to:
   detect a change of a state of the wireless device, the state of the wireless device being maintained as either moving toward the current serving cell of the wireless device or away from the current serving cell of the wireless device based on a direction of movement of the wireless device relative to the current serving cell of the wireless device; and
   upon detecting a change of the state of the wireless device, perform the functions determining whether the wireless device is moving toward the current serving cell of the wireless device or away from the current serving cell of the wireless device comprising initiating suppression of transmissions from the previous serving cell of the wireless device during detection of the predetermined signal from the cell ahead of the current serving cell if the wireless device is moving toward the current serving cell, and initiating suppression of transmissions from the current serving cell of the wireless device during detection of the predetermined signal from the cell ahead of the current serving cell if the wireless device is moving away from the current serving cell.

28. The wireless device of claim 23 wherein the circuitry is further operative to:
   if the wireless device is moving toward the current serving cell, compensate for a negative frequency offset during cell detection; and
   if the wireless device is moving away from the current serving cell, compensate for a positive frequency offset during cell detection.

29. The wireless device of claim 28 wherein cell detection comprises detecting a secondary synchronization signal such that:
   if the wireless device is moving toward the current serving cell, the circuitry compensates for the negative frequency offset during detection of the secondary synchronization signal; and
   if the wireless device is moving away from the current serving cell, the circuitry compensates for the positive frequency offset during detection of the secondary synchronization signal.

30. The wireless device of claim 28 wherein the negative frequency offset is equal to −2 times a Doppler shift of a serving cell of the wireless device, and the positive frequency offset is equal to +2 times the Doppler shift of the serving cell of the wireless device.

31. The wireless device of claim 30 wherein the circuitry is further operative to:
   repeat cell detection using the Doppler shift of the serving cell of the wireless device.

* * * * *